United States Patent
LeBlanc

(10) Patent No.: US 8,064,132 B1
(45) Date of Patent: Nov. 22, 2011

(54) BINOCULARS WITH ADAPTIVE RETICLE DISPLAY AND ASSOCIATED METHODS

(75) Inventor: Richard Alan LeBlanc, Clermont, FL (US)

(73) Assignee: Vectronix, Inc., Leesburg, VA (US)

( * ) Notice: Subject to any disclaimer, the term of this patent is extended or adjusted under 35 U.S.C. 154(b) by 204 days.

(21) Appl. No.: 12/487,222

(22) Filed: Jun. 18, 2009

Related U.S. Application Data

(60) Provisional application No. 61/073,513, filed on Jun. 18, 2008.

(51) Int. Cl.
*G02B 23/00* (2006.01)

(52) U.S. Cl. .......... 359/428; 359/399; 359/427

(58) Field of Classification Search .......... 359/399–428, 359/483–502, 577–590
See application file for complete search history.

(56) References Cited

U.S. PATENT DOCUMENTS

| | | | |
|---|---|---|---|
| 2,138,067 A | 11/1938 | Mossberg | |
| 2,171,571 A | 9/1939 | Karnes | |
| 2,270,307 A | 1/1942 | Karnes | |
| 2,392,979 A | 1/1946 | Douden | |
| 2,420,253 A | 5/1947 | Land | |
| 2,490,091 A | 12/1949 | Reardon | |
| 3,230,627 A | 1/1966 | Rickert et al. | |
| 4,057,318 A | 11/1977 | Schindl | |
| 4,792,673 A | 12/1988 | Blackler | |
| 5,349,179 A | 9/1994 | Morley | |
| 5,434,704 A | 7/1995 | Connors et al. | |
| 7,355,790 B1 | 4/2008 | Wagner et al. | |
| 7,502,166 B2 | 3/2009 | Stenton | |
| 7,675,677 B2 * | 3/2010 | Diamantidis | 359/407 |
| 2001/0005281 A1 | 6/2001 | Yu | |
| 2006/0164724 A1 | 7/2006 | Nagata et al. | |
| 2007/0159701 A1 | 7/2007 | Campbell et al. | |

* cited by examiner

*Primary Examiner* — Thong Nguyen
(74) *Attorney, Agent, or Firm* — Jacqueline E. Hartt; GrayRobinson, P.A.

(57) ABSTRACT

A system and method are provided for removing a reticle from visualization in a displayed view in a binocular wherein the reticle is visible during direct scene view. The system includes a filter positioned between a display element and an eyepiece wherein a visual characteristic of the filter matches a corresponding characteristic of the reticle. These matching characteristics thereby render the reticle substantially "invisible" to the user. Exemplary filters can include a monochromatic filter and a polarizer.

15 Claims, 3 Drawing Sheets

BINOCULARS WITH ADAPTIVE RETICLE DISPLAY AND ASSOCIATED METHODS

CROSS-REFERENCE TO RELATED APPLICATIONS

This application claims priority to provisional patent application Ser. No. 61/073,513, filed Jun. 18, 2009.

BACKGROUND OF THE INVENTION

1. Field of the Invention

The present invention relates to devices and methods for enhancing distance vision, and, more particularly, to such devices and methods for providing an adaptive reticle display in binoculars having both direct and image-processed viewing options.

2. Description of Related Art

Binoculars have long been known in the art for providing increased distance vision with depth perception (FIG. 1). A typical binocular has two sides, each of which 10 has an objective lens 11 that creates an image that passes through a prism 12 for correctly orienting the image. Some binoculars include a reticle 13 that is superimposed on the image to achieve distance estimation. The image downstream of the prism 12 is focused at the reticle 13, and an eyepiece 14 permits the user 15 to focus on the reticle 13.

More complex binoculars are also known that have one side 20 through which a displayed image can be transmitted through the eyepiece 21 (FIG. 2). The direct-image optics are substantially the same, but a visual display 22 and projection optics 23 are positioned upstream of the eyepiece 21 and reticle 24. Here the prism 25 has one surface that is not completely reflective and serves as a beamsplitter 26, permitting the user 27 to see through the prism 25. The characteristics of the beamsplitter 26 determine the mix of the display 22 and scene viewed by the user 27. Exemplary characteristics can include intensity splitting (e.g., 80/20), spectral (e.g., red/visible without red), and polarized (p and s).

Typically a user will not wish the reticle to be superimposed on a displayed image, for example, if the size, orientation, or location of the displayed image is different from that of the scene viewed through the objective and prism.

Therefore, it would be desirable to provide a binocular system that can eliminate visualization of the reticle when viewing a displayed image.

SUMMARY OF THE INVENTION

The present invention is directed to a system and method for removing a reticle from visualization in a displayed view in a binocular wherein the reticle is visible during direct scene view. The system comprises a filter positioned between a display element and an eyepiece wherein a visual characteristic of the filter matches a corresponding characteristic of the reticle. These matching characteristics thereby render the reticle substantially "invisible" to the user when viewing the displayed scene.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 3-8C.

The system and method of the present invention serves to remove a reticle from visualization in a displayed view in a binocular wherein the reticle is visible during direct scene view.

Figure 1:
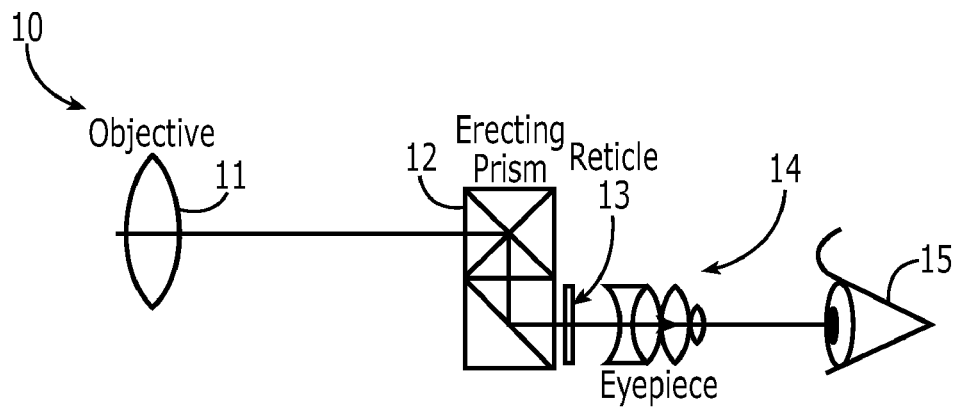
FIG. 1 (prior art) is a schematic diagram of an optical arrangement of a binocular.
Figure 2:
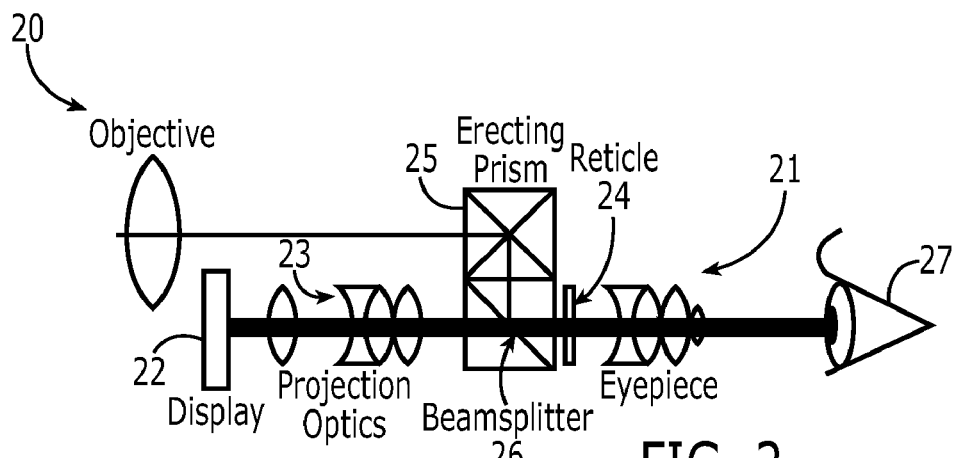
FIG. 2 (prior art) is a schematic diagram of an optical arrangement of a binocular having a display added to one side thereof.
Figure 3:
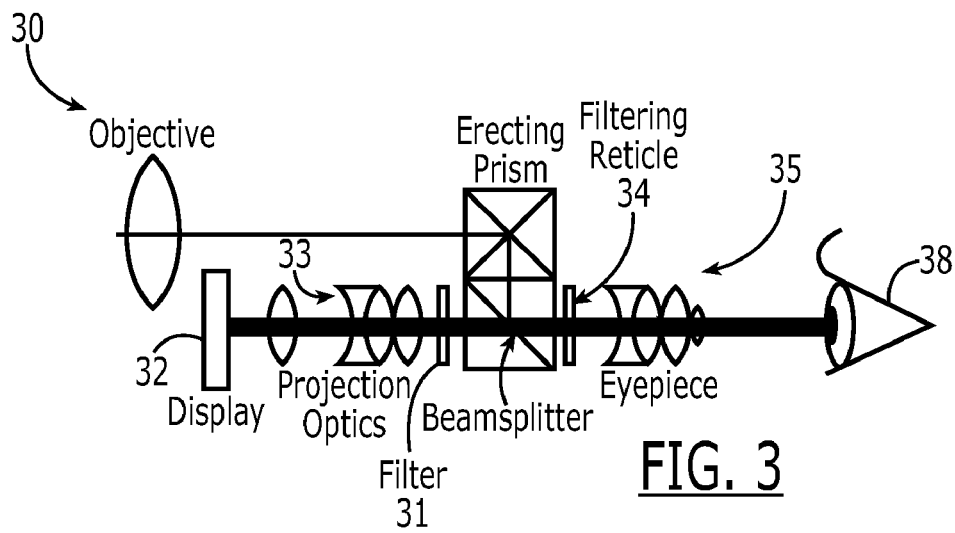
FIG. 3 is a schematic diagram of an optical arrangement having a filtered display.

In a first embodiment (FIGS. 3-6) the system 30 comprises a narrowband, monochromatic filter 31 positioned in the display path. As illustrated in FIG. 3, an exemplary location of the filter 31 can be between the display 32 and projection optics 33 upstream of the filter 31, and the reticle 34 and eyepiece 35 downstream of the filter 31.

The display 32 in this embodiment can comprise, for example an LCD display illuminated with a narrowband LCD, although this is not intended to be limiting, and a single-color OLED-type display could also be used. These options are energy-efficient during display use.

Figure 4:
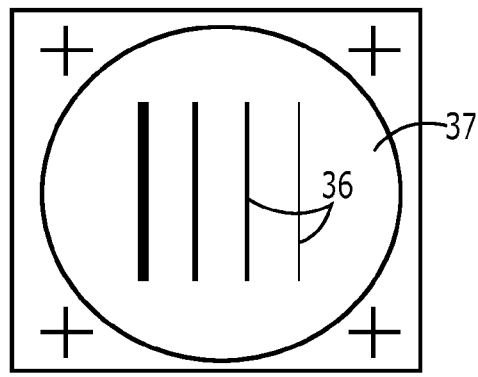
FIG. 4 is a representation of a front plan view of a reticle designed for green illumination.

The reticle 34 can comprise, for example, a glass substrate, which has a high transmission in the visible. The reticle lines 36 (see FIG. 4) can be deposited on the substrate 37, the lines 36 transmitting the display color and thereby made substantially invisible to the user 38. FIG. 4 is a representation of a photograph of a reticle 34 designed for green illumination.

It is important that the transmission and waveband of the filter 31 and reticle lines 36 be well controlled to ensure that the appearance of the lines 36 be minimized against the display 32. One method includes matching the spectra of the display illumination 39 and the lines 40 as closely as possible, with a substantially step-function shape, with substantially either full or no transmission (FIG. 5).

In another method, the spectra of the filter 41 and reticle lines 42 are not matched (FIG. 6); however, the display spectrum 41 is fully within that 42 of the reticle lines 42, and out-of-bandwidth transmission of the filter 41 is preferably low.

Figure 5:
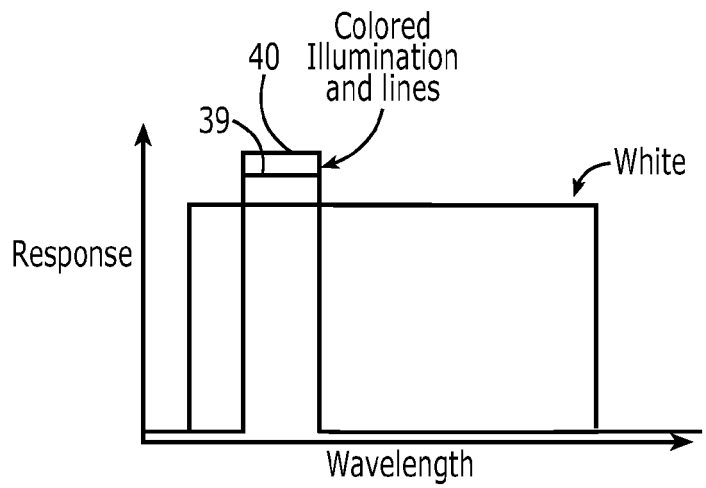
FIG. 5 is a graph of a bandpass for a matched display filter and reticle lines.
Figure 6:
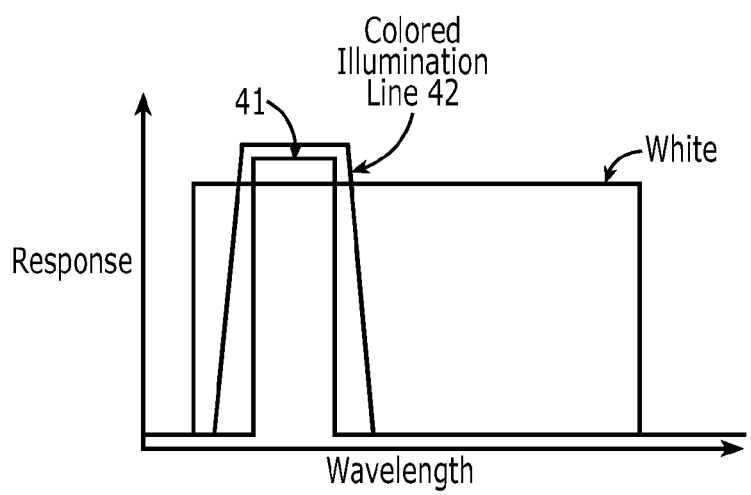
FIG. 6 is a graph of a bandpass for an unmatched display filter and reticle lines.
Figure 7:
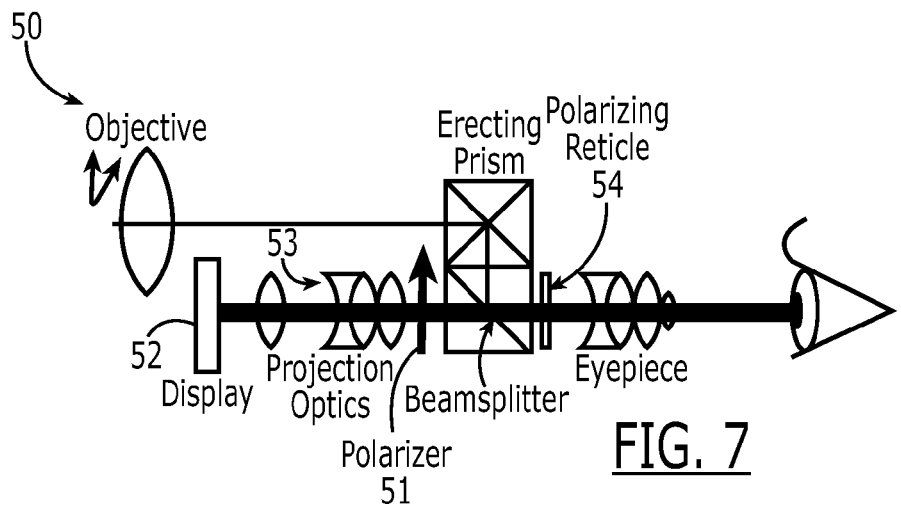
FIG. 7 is a schematic diagram of an optical arrangement including a polarized display having reticle lines aligned with the polarization direction.

In the examples of FIGS. 5 and 6, the reticle lines 36,42 appear against a white-light background as having color when the user is using the binoculars for direct view, and the lines 36,42 substantially disappear when the user is using the binoculars for display view.

Experiments were undertaken wherein a blue filter was placed partially in the field at the reticle, appearing as a section of a circle; a similar blue filter was also placed partially in the field of the display, which also appeared as a section. The resulting photographs (reported but not included) illustrated that the images were substantially similar. It will be understood by one of skill in the art that other colors could be used, and, in fact, red may be preferable to minimize the impact on night vision.

In another experiment, green lines were deposited on a substrate, and a full filter with the same bandpass was placed downstream of the display. The lines appeared clearly in the white-light view, but substantially disappear on the display view.

Another embodiment of a system 50 for minimizing the appearance of reticle lines in a display (FIG. 9) comprises a polarizer 51 positioned downstream of a display 52 and projection optics 53. Here the reticle 54 has lines thereon that are also polarized. If the respective polarizations are aligned, the lines substantially disappear against a displayed image, but are visible against a real-world image, with an approximately 50% transmission, which provides sufficient contrast.

Figure 8A:
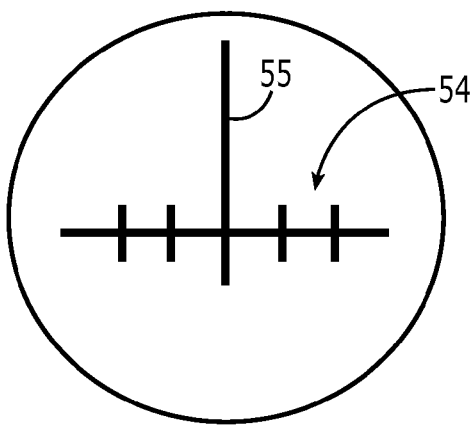
FIGS. 8A-8C are representations of photographs of a polarization strip being rotated for full transmission (FIG. 8A), partial transmission (FIG. 8B), and zero transmission (FIG. 8C).
Figure 8B:
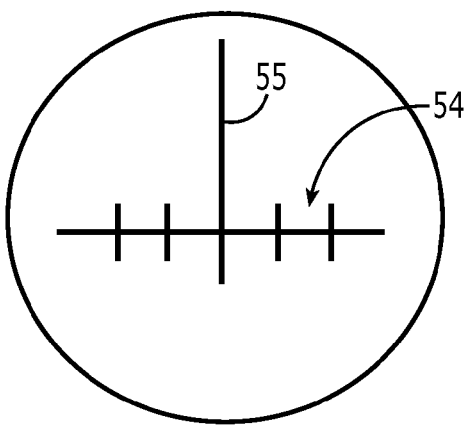
Figure 8C:
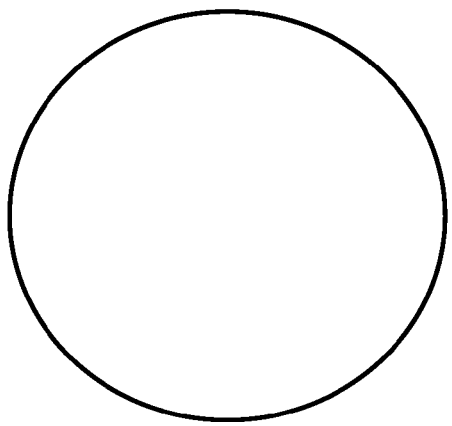

The use of this embodiment 50 is illustrated schematically to represent photographs in FIGS. 8A-8C, wherein a thin strip of polarizing plastic was placed in the field at the reticle 54. When oriented to transmit the reticle 54 (FIG. 8A), the line 55 is clearly visible; as the reticle 54 is rotated, the lines fade (FIG. 8B) and then become substantially transparent (FIG. 8C).

Another polarizing element for this embodiment 50 could comprise a wire grid having a transmission similar to that of glass, that is, approximately 96%.

If, for either a spectral or polarization embodiment, the transmission of the reticle is insufficiently proximate to the transmission of the substrate, it would be preferable to adjust the substrate transmission. For example, in the case of the wire grid embodiment 50, which may achieve approximately a 90% transmission, an antireflection coating could be used on the back of the substrate to avoid loss of energy at this point. The front of the substrate could be masked at the reticle line locations, and then the substrate coated to achieve 90% transmission. The mask would then be removed, and polarized lines could be deposited, having 90% transmission of parallel polarization.

In this device, the reticle is approximately 50% effective against random polarization, and better matches the substrate for parallel polarization. Reducing substrate transmission to match the reticle will reduce overall transmission for the direct view mode, however.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction or use.

What is claimed is:

1. Binoculars for direct view and image view comprising:
   a first optical path for transmitting a direct view of a scene to an eyepiece;
   a second optical path for transmitting a displayed image of the scene to the eyepiece comprising a display and projection optics downstream of the display;
   a filter having a first visual characteristic positioned along the second optical path between the projection optics and the eyepiece; and
   a filtering reticle having a second visual characteristic substantially matching the first visual characteristic positioned in the first and the second optical path downstream of the filter and upstream of the eyepiece, a combination of the first and the second visual characteristics adapted to render the reticle substantially invisible in the displayed image, the reticle visible in the direct view.

2. The binoculars recited in claim 1, wherein the displayed image is in a first wavelength range and the reticle comprises a plurality of lines on a substrate, a wavelength of the lines falling within a second wavelength range substantially encompassed by the first wavelength range.

3. The binoculars recited in claim 2, wherein the first and the second wavelength ranges are substantially equal.

4. The binoculars recited in claim 2, wherein the first and the second wavelength ranges comprise substantial step functions.

5. The binoculars recited in claim 1, wherein the filter comprises a polarizer and the filtering reticle comprises polarized lines, a first relative orientation of the polarizer and the filtering reticle permitting viewing of the lines in the displayed image, a second relative orientation substantially normal to the first relative orientation rendering the lines substantially invisible in the displayed image, the lines visible under unpolarized light.

6. Binoculars for direct view and image view comprising:
   a first optical path comprising an objective lens for producing a direct view of a scene;
   a second optical path comprising a display and projection optics downstream of the display for producing an image view of the scene;
   an eyepiece;
   a beamsplitter positioned upstream of the eyepiece and downstream of the first and the second optical paths, for producing at the eyepiece at least one of the direct view and the image view;
   a filter positioned between the projection optics and the beamsplitter having a first visual characteristic; and
   a filtering reticle having a second visual characteristic substantially matching the first visual characteristic positioned in the first and the second optical paths downstream of the beamsplitter and upstream of the eyepiece, a combination of the first and the second visual characteristics adapted to render the reticle substantially invisible in the displayed image and visible in the direct view.

7. The binoculars recited in claim 6, wherein the displayed image is in a first wavelength range and the reticle comprises a plurality of lines on a substrate, a wavelength of the lines falling within a second wavelength range substantially encompassed by the first wavelength range.

8. The binoculars recited in claim 7, wherein the first and the second wavelength ranges are substantially equal.

9. The binoculars recited in claim 7, wherein the first and the second wavelength ranges comprise substantial step functions.

10. The binoculars recited in claim 6, wherein the filter comprises a polarizer and the filtering reticle comprises polarized lines, a first relative orientation of the polarizer and the filtering reticle permitting viewing of the lines in the displayed image, a second relative orientation substantially normal to the first relative orientation rendering the lines substantially invisible in the displayed image, the lines visible under unpolarized light.

11. A method of forming a direct view and a display image of a scene comprising:
   transmitting a direct view of a scene to an eyepiece along a first optical path;
   transmitting a displayed image of the scene to the eyepiece along a second optical path comprising a display and projection optics downstream of the display;
   using a filter for filtering the displayed image upstream of the eyepiece to transmit light having a first visual characteristic; and
   imposing a filtering reticle having a second visual characteristic substantially matching the first visual characteristic in the first and the second optical paths downstream of the filter and upstream of the eyepiece, a combination of the first and the second visual characteristics adapted to render the reticle substantially invisible in the displayed image, the reticle visible in the direct view.

12. The method recited in claim 11, wherein the displayed image is transmitted in a first wavelength range and the reticle comprises a plurality of lines on a substrate, a wavelength of the lines falling within a second wavelength range substantially encompassed by the first wavelength range.

13. The method recited in claim 12, wherein the first and the second wavelength ranges are substantially equal.

14. The method recited in claim 12, wherein the first and the second wavelength ranges comprise substantial step functions.

15. The method recited in claim 11, wherein the filtering step comprises polarizing the displayed image and the filtering reticle comprises polarized lines, a first orientation of the filtering reticle permitting viewing of the lines in the displayed image, a second orientation substantially normal to the first relative orientation rendering the lines substantially invisible in the displayed image, the lines visible under unpolarized light.

* * * * *